United States Patent [19]

Rosaen

[11] 4,032,451

[45] June 28, 1977

[54] FILTER DEVICE WITH ROTATABLE BYPASS VALVE

[76] Inventor: Nils O. Rosaen, 3774 Quarton Road, Bloomfield Hills, Mich. 48013

[22] Filed: Mar. 31, 1975

[21] Appl. No.: 563,802

[52] U.S. Cl. .............................. 210/232; 210/130; 210/420; 210/446; 210/DIG. 14

[51] Int. Cl.² .......................................... B01D 29/00

[58] Field of Search .......... 210/130, 133, 135, 340, 210/341, 418, 420, 421, DIG. 14, 232, 446

[56] References Cited

UNITED STATES PATENTS

| | | | |
|---|---|---|---|
| 2,630,228 | 3/1953 | Wright et al. | 210/130 X |
| 3,056,503 | 10/1962 | Roosa | 210/232 X |
| 3,229,816 | 1/1966 | Rosaen | 210/130 |
| 3,306,451 | 2/1967 | Kudlaty | 210/420 X |
| 3,341,018 | 9/1967 | Kudlaty | 210/130 |
| 3,476,251 | 11/1969 | Kudlaty | 210/420 X |
| 3,503,511 | 3/1970 | Spitzberg | 210/232 |
| 3,887,467 | 6/1975 | Johnson | 210/232 X |

Primary Examiner—Thomas G. Wyse
Assistant Examiner—Robert H. Spitzer
Attorney, Agent, or Firm—Gifford, Chandler, Sheridan & Sprinkle

[57] ABSTRACT

A fluid filter device having a filter chamber and a cylindrical bypass valve mounted so as to be rotatable about its longitudinal axis between a filtering position and a bypass position. In the bypass position the fluid passes from one end of the valve through to its opposite end toward the filter outlet; in the filtering position the fluid passes through a side opening in the valve to the filter chamber and then is returned to the bypass valve before being discharged through the filter outlet.

5 Claims, 5 Drawing Figures

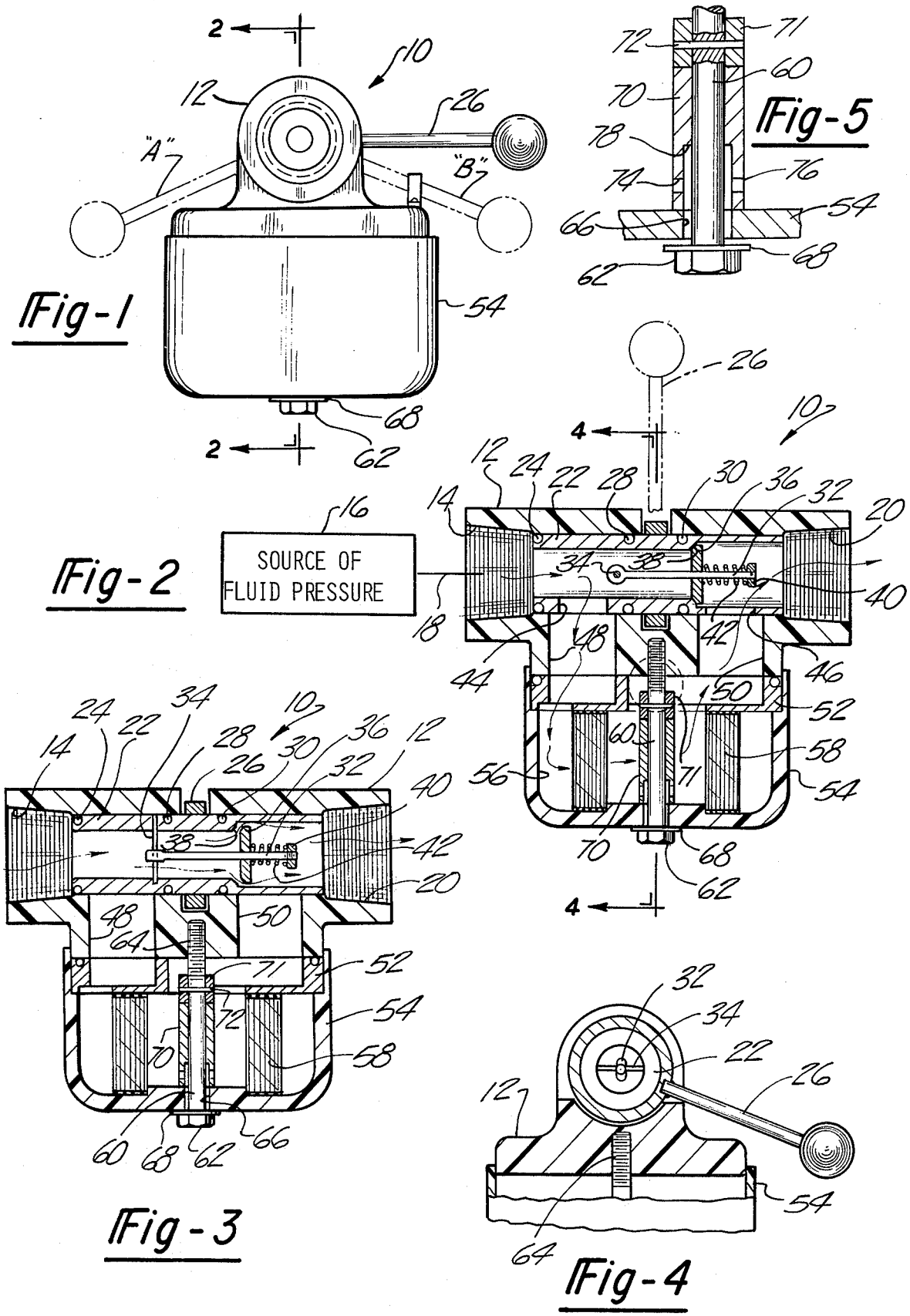

FILTER DEVICE WITH ROTATABLE BYPASS VALVE

BACKGROUND OF THE INVENTION

This invention relates to a fluid filter device and more particularly to such a device having a bypass valve which is rotatable between a position in which the fluid bypasses the filter chamber and a filtering position in which the fluid is passed through the filter chamber.

SUMMARY OF THE INVENTION

An object of the present invention is to provide a fluid filter device having a substantially cylindrical bypass valve member in which the fluid is received through one end and discharged through the opposite end. In the bypass position, the valve is disposed such that the fluid passes along a linear path from the inlet of the valve toward the outlet. The valve is movable to a filtering position in which the fluid is passed through a side opening of the valve toward the filter chamber and is then returned from the filter chamber to another opening in the bypass valve before being discharged through the filter outlet. One advantage of such a device is that it can be manufactured with relatively few components.

Another object of the invention is to provide a filter device having a hollow cover which provides a filter chamber. The cover is connected to the filter body by means of a headed bolt. The bolt carries a sleeve between the cover and the body in such a manner that as the bolt is threadably removed from the body, the sleeve engages the cover to separate it from the body. The sleeve and the cover also have openings that are so aligned as to allow air to be received into the filter chamber as the cover is being removed. This arrangement facilitates removal of the cover.

These and other objects of the invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views, and in which:

FIG. 1 is a view of a filter device illustrating the preferred embodiment of the invention;

FIG. 2 is a view taken along lines 2—2 of FIG. 1 showing the bypass valve in its filtering position;

FIG. 3 is a view similar to FIG. 2 but showing the bypass valve in its bypass position;

FIG. 4 is a view taken along line 4—4 of FIG. 2; and

FIG. 5 is an enlarged view showing the manner in which the filter cover bolt removes the cover from the filter body.

DESCRIPTION OF THE PREFERRED EMBODIMENT

Referring to the drawings, FIGS. 1 and 2 illustrate a preferred filter device 10 as comprising a body 12 having an inlet opening 14 connected to a source of fluid pressure 16 through conduit means 18. Body 12 also has an outlet opening 20 on the opposite side of inlet opening 14 for the removal of fluid from the filter device.

An elongated cylindrical bypass valve member 22 is mounted in body 12 so as to be rotatable about its longitudinal axis. An annular member 24 is sealingly mounted between body 12 and the inlet end of valve member 22.

A handle 26 is connected to the midsection of bypass valve member 22, and is rotatable between a filtering position illustrated at A in phantom in FIG. 1 and a bypass position illustrated at B. A pair of annular members 28 and 30 are mounted on opposite sides of handle 26 to form a sealing engagement between body 12 and valve member 22.

As best illustrated in FIGS. 2 and 3, an elongated guide member 32 is disposed in valve member 22 adjacent its longitudinal axis. A pin 34 connects one end of guide member 32 to the valve member 22. A valve member 36 is slidably mounted on guide member 32 adjacent an annular seat 38 formed in valve member 22. Valve member 36 is movable between a closed position illustrated in FIG. 2, in which it engages annular seat 38 to block fluid flow through valve member 22, and an open position illustrated in FIG. 3 in which valve member 36 is spaced from seat 38 to permit straight-line fluid flow through valve member 22 from inlet 14 toward outlet 20.

A nut 40 is carried on the free end of guide member 32, and a bias member 42 is disposed between valve member 36 and nut 40 to bias valve member 36 toward its closed position. Bias member 42 is chosen such that valve member 36 is opened in response to a perdetermined pressure differential between inlet 14 and outlet 20.

As best illustrated in FIG. 2, valve member 22 has a side opening 44 adjacent the inlet and of the valve member and a second side opening 46 adjacent the outlet end of the valve member. In the filtering position of valve member 22, opening 44 is aligned with a passage 48 in body 12, and opening 46 is aligned with a passage 50 in the body. A baffle 52 is disposed adjacent passages 48 and 50, and a hollow filter cover 54 is seated on baffle 52. Cover 54 forms a filter chamber 56, and baffle 52 is adapted to permit fluid flow from passage 48 into valve chamber 56. Passage 50 allows removal of filtered fluid from the filter chamber.

An annular filter element 58 is disposed in the filter chamber in such a way that fluid being received from passage 48 is passed radially inwardly through the wall of the filter element and then axially outwardly toward passage 50. Filter element 58 is formed to remove undesirable matter from the fluid in the conventional manner.

Referring to FIGS. 2 and 3 an elongated bolt 60 having a head 62 has threaded means 64 engaged with body 12. Bolt 60 passes through an opening 66 in cover 54 that is slightly larger than the diameter of the bolt body. A seal 68 is disposed between head 62 and cover 54 to prevent fluid flow through opening 66 when head 62 is engaged with cover 54 to secure it in position.

A sleeve 70 is carried on bolt 60 between cover 54 and body 12. As best illustrated in FIG. 5, a pin 72 connects the sleeve to bolt 60. Sleeve 70 is spaced from cover 54 when the cover is secured to filter body 12 by the bolt 60.

Referring to FIG. 5, the end of sleeve 70 adjacent body 54 has a pair of openings 74 and 76 adjacent an internal enlargement 78. In order to remove cover 54 from body 12, bolt 60 is unscrewed in the conventional manner. As bolt head 62 is separated from cover 54, opening 66 permits air to be received into the filter chamber. As the bolt 60 is further unscrewed, sleeve 70 engages cover 54 to remove it from the body. Openings 74 and 76 and enlargement 78 then become aligned with opening 66 to allow the air to be received into the filter chamber to facilitate removal of the cover from the body.

In operation the preferred filter device is connected to source of fluid pressure 16. To filter fluid being received from fluid pressure source 16, handle 26 is disposed in position A with valve member 22 in the position illustrated in FIG. 2 so that the fluid passes through opening 44, passage 48, through filter chamber 56 and then is returned through passge 50, opening 46 and the through valve member 22 for discharge through outlet 20. Valve member 36 is normally seated in its closed position when the fluid is being passed through the filter chamber. The seal 24 insures that unfiltered fluid will not be able to find its way between the valve 22 and the housing 12 to thereby interfere with rotation of the valve 22.

When handle 26 is rotated to its bypass position B, as best illustrated in FIG. 3, valve member 22 is disposed to block fluid flow through passages 48 and 50. The fluid then biases valve member 36 toward its open position to pass directly from inlet 14 toward outlet 20 without being filtered.

It should be noted that the preferred filter device is composed of relatively few components with a bypass valve member that can be easily rotated between its filtering and bypass positions.

Having described my invention, I claim:

1. A fluid filter device comprising:
    body means having a cylindrical bore formed therethrough wherein one axial end of said bore forms the fluid inlet for the device while the other axial end of said bore forms the fluid outlet for the device,
    said body means having a filter chamber, said filter chamber having a filter chamber inlet which fluidly communicates with said bore and a filter chamber outlet which fluidly communicates with said bore at a position axially spaced from said filter chamber inlet,
    a filter disposed in said filter chamber and adapted to filter fluid passing from said filter chamber inlet to said filter chamber outlet;
    an elongated cylindrical valve member disposed in said bore and rotatable in said bore between a first and a second rotational position, said valve member having a first and second transverse opening formed therethrough in an axially spaced relationship so that when said valve member is in said first rotational position, said first and second transverse openings respectively register with the filter chamber inlet and the filter chamber outlet to open fluid flow through said filter chamber while when said valve member is in said second rotational position said first and second transverse openings are out of registration with said filter chamber inlet and filter chamber outlet to close fluid flow through said filter chamber,
    a handle secured to and extending transversely from said valve member at a point intermediate said first and second transverse openings for rotating said valve member between said first and said second rotational positions,
    said body means including a body and a cover member disposed on the body to form said filter chamber, fastener means threadably mounted on the body and connected to the cover to ordinarily prevent its removal from the body, the fastener means being removable from the body in a motion in which the fastener means engages the cover to remove it from the body, and
    the cover member having an opening for receiving the fastener means, the cover opening being slightly larger than the fastener means to permit air flow through said cover opening into the filter chamber when said fastener means is being removed from said body.

2. The filter device as defined in claim 1 and including seal means carried by said valve member adjacent said inlet.

3. A fluid filter device comprising:
    body means having a cylindrical bore formed therethrough wherein one axial end of said bore forms the fluid inlet for the device while the other axial end of said bore forms the fluid outlet for the device,
    said body means having a filter chamber, said filter chamber having a filter chamber inlet which fluidly communicates with said bore and a filter chamber outlet which fluidly communicates with said bore at a position axially spaced from said filter chamber inlet,
    a filter disposed in said filter chamber and adapted to filter fluid passing from said filter chamber inlet to said filter chamber outlet,
    an elongated cylindrical valve member disposed in said bore and rotatable in said bore between a first and a second rotational position, said valve member having a first and second transverse opening formed therethrough in an axially spaced relationship so that when said valve member is in said first rotational position, said first and second transverse openings respectively register with the filter chamber inlet and the filter chamber outlet to open fluid flow through said filter chamber while when said valve member is in said second rotational position said first and second transverse openings are out of registration with said filter chamber inlet and filter chamber
    a handle secured to and extending transversely from said valve member at a point intermediate said first and second transverse openings for rotating said valve member between said first and said second rotational positions,
    said body means including a body and a cover member disposed on the body to form said filter chamber, fastener means threadably mounted on the body and connected to the cover to prevent its removal from the body, the fastener means being removable from the body in a motion in which the fastener means engages the cover to remove it from the body,
    said fastener means including an elongated bolt having a head, and a sleeve mounted on the bolt, the cover having an opening for receiving the bolt such that the head is on one side thereof and the sleeve is disposed on the other side thereof between the cover and the body such that as the bolt is threadably removed from the body and the sleeve engages the cover to remove it from the body, and
    the sleeve having one end engageable with the cover as the bolt is being removed from the body, and including opening means in the sleeve to form fluid communication between the filter chamber and the cover opening so that as the fastener means is removed air passes through said cover opening and said opening means into said filter chamber to aid in the removal of said cover member.

4. A fluid filter device comprising:

body means having a cylindrical bore formed therethrough wherein one axial end of said bore forms the fluid inlet for the device while the other axial end of said bore forms the fluid outlet for the device, said body means having a filter chamber, said filter chamber having a filter chamber inlet which fluidly communicates with said bore and a filter chamber outlet which fluidly communicates with said bore at a position axially spaced from said filter chamber inlet, a filter disposed in said filter chamber and adapted to filter fluid passing from said filter chamber inlet to said filter chamber outlet, an elongated cylindrical valve member disposed in said bore and rotatable in said bore between a first and a second rotational position, said valve member having a first and a second transverse opening formed therethrough in an axially spaced relationship so that when said valve member is in said first rotational position, said first and second transverse openings respectively register with the filter chamber inlet and the filter chamber outlet to open fluid flow through said filter chamber while when said valve member is in said second rotational position said first and second transverse openings are out of registration with said filter chamber inlet and filter chamber outlet to close fluid flow through said filter chamber, a handle secured to and extending transversely from said valve member at a point intermediate said first and second transverse openings for rotating said valve member between said first and said second rotational positions, and said body means including a body and a lower member disposed on the body to form said filter chamber, and a fastener means for fastening said cover member to said body, said cover member having an opening for receiving the fastener means, the cover opening being slightly larger than the fastener means to permit air flow through said cover opening into the filter chamber when said fastener means is being removed from said body.

5. A fluid filter device comprising:

body means having a cylindrical bore formed therethrough wherein one axial end of said bore forms the fluid inlet for the device while the other axial end of said bore forms the fluid outlet for the device, said body means having a filter chamber, said filter chamber having a filter chamber inlet which fluidly communicates with said bore and a filter chamber outlet which fluidly communicates with said bore at a position axially spaced from said filter chamber inlet, a filter disposed in said filter chamber and adapted to filter fluid passing from said filter chamber inlet to said filter chamber outlet, an elongated cylindrical valve member disposed in said bore and rotatable in said bore between a first and a second rotational position, said valve member having a first and second transverse opening formed therethrough in an axially spaced relationship so that when said valve member is in said first rotational position, said first and second transverse openings respectively register with the filter chamber inlet and the filter chamber outlet to open fluid flow through said filter chamber while when said valve member is in said second rotational position said first and second transverse openings are out of registration with said filter chamber inlet and filter chamber outlet to close fluid flow through said filter chamber;

a handle secured to and extending transversely from said valve member at a point intermediate said first and second transverse openings for rotating said valve member between said first and said second rotational positions, said body means including a body and a cover member disposed on the body to form said filter chamber, fastener means for fastening said cover member to said body, said fastener means including an elongated bolt having a head, and a sleeve mounted on the bolt, opening means in the sleeve to form fluid communication between the filter chamber and the cover opening so that as the fastener means is removed air passes through said cover opening and said opening means into said filter chamber to aid in the removal of said cover member.

* * * * *

UNITED STATES PATENT AND TRADEMARK OFFICE
CERTIFICATE OF CORRECTION

PATENT NO. : 4,032,451
DATED : June 28, 1977
INVENTOR(S) : Nils O. Rosaen

It is certified that error appears in the above-identified patent and that said Letters Patent are hereby corrected as shown below:

Col. 4, line 43, after "chamber", insert --outlet to close fluid flow through said filter chamber,--.
line 63, delete "and" after --body--. (our mistake)

Signed and Sealed this

Second Day of May 1978

[SEAL]

Attest:

RUTH C. MASON
Attesting Officer

LUTRELLE F. PARKER
Acting Commissioner of Patents and Trademarks